US010120622B2

(12) United States Patent
Takata

(10) Patent No.: US 10,120,622 B2
(45) Date of Patent: Nov. 6, 2018

(54) PRINTING MACHINE

(71) Applicant: RISO KAGAKU CORPORATION, Tokyo (JP)

(72) Inventor: Atsushi Takata, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 15/843,459

(22) Filed: Dec. 15, 2017

(65) Prior Publication Data

US 2018/0173475 A1 Jun. 21, 2018

(30) Foreign Application Priority Data

Dec. 20, 2016 (JP) ................. 2016-246611

(51) Int. Cl.
*G06F 3/12* (2006.01)
*B41F 33/16* (2006.01)
*B41J 29/38* (2006.01)

(52) U.S. Cl.
CPC ............ *G06F 3/1236* (2013.01); *B41F 33/16* (2013.01); *B41J 29/38* (2013.01); *G06F 3/1203* (2013.01); *G06F 3/1286* (2013.01)

(58) Field of Classification Search
None
See application file for complete search history.

(56) References Cited

U.S. PATENT DOCUMENTS

| 5,841,991 | A  | * | 11/1998 | Russell | .................. | H04L 29/06 |
|           |    |   |         |         |                    | 709/221    |
| 8,270,017 | B2 | * | 9/2012  | Tanji   | ..................... | G06F 21/608 |
|           |    |   |         |         |                    | 358/1.14   |
| 8,291,071 | B2 | * | 10/2012 | Kaneko  | ............... | H04L 41/0853 |
|           |    |   |         |         |                    | 709/223    |
| 8,458,325 | B2 | * | 6/2013  | Hansaki | .................. | B41J 29/38 |
|           |    |   |         |         |                    | 455/420    |
| 9,104,354 | B2 | * | 8/2015  | Yoshida | ................. | G06F 3/1231 |
| 9,489,154 | B1 | * | 11/2016 | Haapanen | ............. | G06F 3/1203 |
| 9,832,641 | B2 | * | 11/2017 | Ando    | .................... | H04W 76/10 |
| 2010/0103457 | A1 | * | 4/2010 | Nakamura | ........ | H04L 29/12216 |
|           |    |   |         |         |                    | 358/1.15   |

FOREIGN PATENT DOCUMENTS

JP 2011-233117 A 11/2011

* cited by examiner

*Primary Examiner* — Dung D Tran
(74) *Attorney, Agent, or Firm* — Greenblum & Bernstein, P.L.C.

(57) ABSTRACT

A printing machine includes a storing unit, a determination section, and an execution section. The storing unit stores MAC addresses of information processing machines when the power is turned off. The determination section collects MAC addresses of information processing machines through a network when the printing machine is turned on. The determination section determines which of an initial configuration support process and a registration support process is to be executed on the basis of the number of changes in a comparison of the MAC address collected and the MAC address stored in the storing unit, the initial configuration support process supporting an execution of an initial configuration of the printing machine, the registration support process supporting an execution of a registration process of the terminal. The execution section executes a process determined by the determination section.

2 Claims, 5 Drawing Sheets

PRINTING MACHINE

CROSS REFERENCE TO RELATED APPLICATION

This application claims benefit of priority under 35 U.S.C. § 119 to Japanese Patent Application No. 2016-246611, filed on Dec. 20, 2016, the entire contents of which are incorporated by reference herein.

BACKGROUND OF THE INVENTION

1. Field of the Invention

The present invention relates to a printing machine that appropriately performs an initial configuration and a user registration.

2. Description of the Related Art

In recent years, many offices have a plurality of computers connected to a printing machine through a network to share the printing machine among the plurality of computers.

From the perspective of security, to ensure that a user who performed a print request operation on a computer obtains a print, the printing machine outputs the print only when the user who performed the operation is authenticated on the basis of an authentication operation by the user on an operation panel.

To perform such a user authentication, it is necessary to register users who use the printing machine and to determine whether or not a user who performs the operation is a registered user on the basis of the authentication operation by the user on the operation panel.

Patent Literature 1 (Japanese Patent Application Laid-Open No. 2011-233117) discloses a technique regarding a printing system that includes a printing machine to perform printing, a printing instruction machine to give a printing instruction to the printing machine, and an authentication machine to authenticate a user who operates the printing instruction machine. Specifically, the authentication machine receives a MAC address and the like of a PC that the user operates, and sends a notification of absence of registration to the PC when a user ID, which is associated with a MAC address same as the received MAC address, is not registered in a MAC address data table. The authentication machine then receives a user ID and a MAC address sent from the PC, and registers them in the MAC address data table. When the user ID is already registered, a notification of printing allowance is sent to the PC. The PC that received the notification of printing allowance sends printing data to the printing machine and the printing machine performs printing.

When the number of users who newly use the printing machine increases due to, for example, employment of new workers, it is necessary to register new users before they start using the printing machine. In this case, there is no need to perform an initial configuration for the printing machine, and only the registration of the new users is performed. This shortens setting time.

Moreover, there is a case in which when the printing machine is relocated, or users who use the installed printing machine greatly change due to an entity conversion. In such a case, in addition to the registration of new users, it is often necessary to perform a network setting, a language setting, a time setting, and the like at the same time. For that reason, performing the initial configuration for the printing machine again configures an appropriate usage environment for the printing machine.

The printing system described in Patent Literature 1 does not determine whether to perform the initial configuration or to perform only the registration of new users when MAC addresses are changed. A user is thus obliged to determine either to perform the registration of new users or to perform the initial configuration by oneself. This leads to a useless setting, or a necessary setting is not performed on the contrary, thereby having a malfunctioning in printing.

SUMMARY OF THE INVENTION

The present invention is made in view of the above discussion. An object of the present invention is to provide a printing machine that appropriately performs an initial configuration and a user registration.

To achieve the above-described object, according to a first aspect of the present invention, there is provided a printing machine to be connected with a plurality of terminals through a network to execute printing processing based on a printing job sent from each terminal, the printing machine including: a storage device that stores MAC addresses of all terminals connected to the printing machine when the printing machine is turned off; and a processor that collects MAC addresses of all terminals connected to the printing machine through the network when the printing machine is turned on, determines which of an initial configuration support process and a registration support process is to be executed based on the number of changes in a comparison of the MAC addresses collected with the MAC addresses stored in the storage device, the initial configuration support process supporting an execution of an initial configuration of the printing machine, and the registration support process supporting an execution of a registration process of the terminal, and executes the determined process.

According to a second aspect of the present invention, the storage device further stores a maintenance object flag to indicate whether or not the printing machine is an object machine of a maintenance contract, and a contact address of a maintenance contract counterparty, and wherein when the number of changes in the MAC addresses at a time when the printing machine is turned on is a predetermined ratio or more, and when the maintenance object flag stored in the storage device indicates that the printing machine is the object machine of the maintenance contract, the processor notifies the contact address of the need for maintenance through the network.

According to the first aspect of the present invention, the processor collects MAC addresses of all terminals connected to the printing machine through the network when the printing machine is turned on, determines which of an initial configuration support process and a registration support process is to be executed based on the number of changes in a comparison of the MAC addresses collected with the MAC addresses stored in the storage device, the initial configuration support process supporting an execution of an initial configuration of the printing machine, and the registration support process supporting an execution of a registration process of the terminal.

For example, when the printing machine is relocated, or users who use the installed printing machine greatly change due to an entity conversion while the power of the printing machine is off, the initial configuration support process is executed. Moreover, when the number of users who use the printing machine increases by several users at once, for example, when several new employees are assigned, the registration support process is executed.

This prevents the user from forgetting the initial configuration and the registration process, and enables the user to appropriately perform the initial configuration or the user registration.

According to the second aspect of the printing machine in the present invention, when the number of changes in the MAC addresses at a time when the printing machine is turned on is a predetermined ratio or more, and when the maintenance object flag stored in the storage device indicates that the printing machine is the object machine of the maintenance contract, the processor notifies the contact address of the need for maintenance through the network.

This eliminates the need for contacting the maintenance contract counterparty from the user about relocation of the printing machine or an entity conversion, and enables the user to receive enough maintenance for the printing machine by the maintenance contract counterparty.

BRIEF DESCRIPTION OF THE DRAWINGS

FIG. 4 is a flowchart of a process performed by the printing machine according to the exemplary embodiment of the present invention when the power of the printing machine is turned on.

FIG. 5 is a flowchart particularly explaining a process related to maintenance, which is included in the process performed by the printing machine according to the exemplary embodiment of the present invention when the printing machine is turned on.

FIG. 6 is a flowchart particularly explaining an initial configuration support process and a registration support process, which are included in the process performed by the printing machine according to the exemplary embodiment of the present invention when the printing machine is turned on.

DESCRIPTION OF THE EMBODIMENTS

A printing machine according to an exemplary embodiment of the present invention will be described below with reference to the accompanying drawings. The printing machine according to the exemplary embodiment presents an example of an apparatus and the like for realizing the technical concept of the present invention. The technical concept of the present invention regarding the arrangement and the like of various structural components is not limited to the embodiment. Various modifications can be made in the technical concept of the present invention within the scope of claims.

Figure 1:
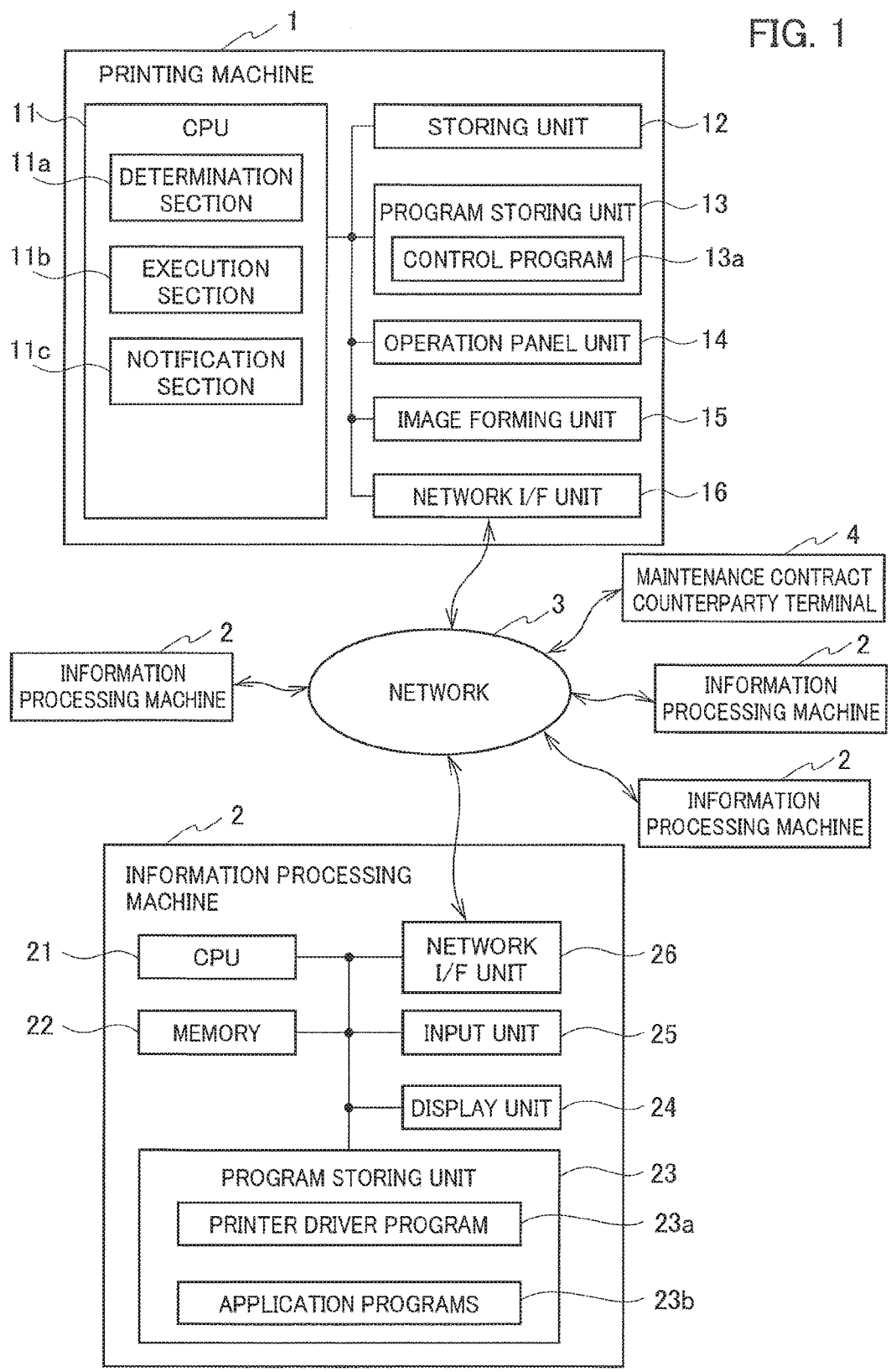
FIG. 1 is a diagram illustrating configurations of a printing machine and an information processing machine according to an exemplary embodiment of the present invention.

FIG. 1 is a diagram illustrating configurations of a printing machine 1 and an information processing machine 2 according to an exemplary embodiment of the present invention.

As shown in FIG. 1, the printing machine 1 is connected to a plurality of information processing machines 2 (four in the present embodiment) through a network 3 such as a wired or a wireless intranet, or the Internet. The printing machine 1 is configured to receive a printing job from each of the information processing machines 2 and to form an image. The printing machine 1 is also connected to a maintenance contract counterparty terminal 4 through the network 3.

Each of the information processing machines 2, which is a computer machine such as a general-purpose personal computer, a tablet, or a smartphone, generates a printing job and sends it to the printing machine 1 through the network 3 for printing. Each of the information processing machines 2 includes a CPU (processor) 21, memory 22, a program storing unit 23, a display unit 24 such as a liquid display, an input unit 25 such as a keyboard or a mouse, a network I/F unit 26 to be connected to the network 3, and the like.

The program storing unit 23 stores OS (operating system) program (not shown), a printer driver program 23a, and various application programs 23b including a browser program, a word processing program and the like.

The CPU 21 executes each program stored in the program storing unit 23 to control operations of the whole of the information processing machine 2. In particular, the CPU 21 executes the printer driver program 23a to generate a printing job on the basis of data generated by the various application programs 23b, such as the browser program and the word processing program, to send the printing job to the printing machine 1.

The CPU 21 notifies own MAC address in response to an ARP (Address Resolution Protocol).

The printing machine 1 includes a CPU (processor) 11, a storing unit (storage device) 12, a program storing unit 13, an operation panel unit 14, an image forming unit 15, a network I/F unit 16 to be connected to the network 3, and the like.

The storing unit 12 stores printing jobs sent from each of the information processing machines 2, and an ARP table which maps an IP address to a MAC address of each of the information processing machines 2 when the power is turned off. While the power is on, the printing machine 1 communicates with each of the information processing machines 2 connected to the network 3 at predetermined intervals to bring the ARP table up-to-date.

The storing unit 12 stores a maintenance object flag to indicate whether or not the printing machine 1 is an object machine of a maintenance contract, and a contact address of the maintenance contract counterparty terminal 4.

The program storing unit 13 stores a control program 13a, which makes the CPU 11 control operations of the whole of the printing machine 1 and makes the CPU 11 work as a determination section 11a, an execution section 11b, and a notification section 11c.

The operation panel unit 14 receives various settings for the printing machine 1 through user operations, such as power-on and power-off, switching in image forming including a copy, a printing and the like, and a combination of the number of sheets, the size of the sheets, and density of printing in the image forming.

The image forming unit 15 forms an image on the basis of a printing job received from each of the information processing machines 2. The image forming unit 15 performs image forming in various printing methods including an inkjet method to discharge ink drops from ink heads for respective colors, a stencil printing method, a laser printing method, and the like.

The CPU 11 executes the control program 13a stored in the program storing unit 13 to control the whole of the printing machine 1 and to work as the determination section 11*a*, the execution section 11*b*, and the notification section 11*c*, which embody functions of the printing machine 1.

When the printing machine 1 is turned on, the determination section 11*a* collects a MAC address of each of the information processing machines 2 through the network 3. The determination section 11*a* then compares the collected MAC addresses with the MAC addresses stored in the storing unit 12 to obtain the number of changes in MAC addresses. On the basis of the number of changes, the determination section 11*a* determines which of an initial configuration support process and a registration support process is to be executed. It is noted that the initial configuration support process supports an execution of an initial configuration of the printing machine, and the registration support process supports an execution of a registration process of the terminal. In the present embodiment, as each user uses one of the information processing machines 2, a relationship of a user and a MAC address are considered as a one-to-one correspondence.

The execution section 11*b* executes a process determined by the determination section 11*a*.

When the number of changes in the MAC addresses at the time when the printing machine 1 is turned on is a predetermined ratio or more, and the maintenance object flag stored in the storing unit 12 indicates that the printing machine 1 is an object machine of the maintenance contract, the notification section 11*c* notifies the maintenance contract counterparty terminal 4 of the need for maintenance through the network 3 using the contact address thereof.

Operations of the printing machine 1, which is configured as described above, will be described below with reference to the accompanying drawings.

The printing machine 1 mainly performs a MAC address update process, a power-off process, and a power-on process. Each process will be described in detail below.

(MAC Address Update Process)

Figure 2:
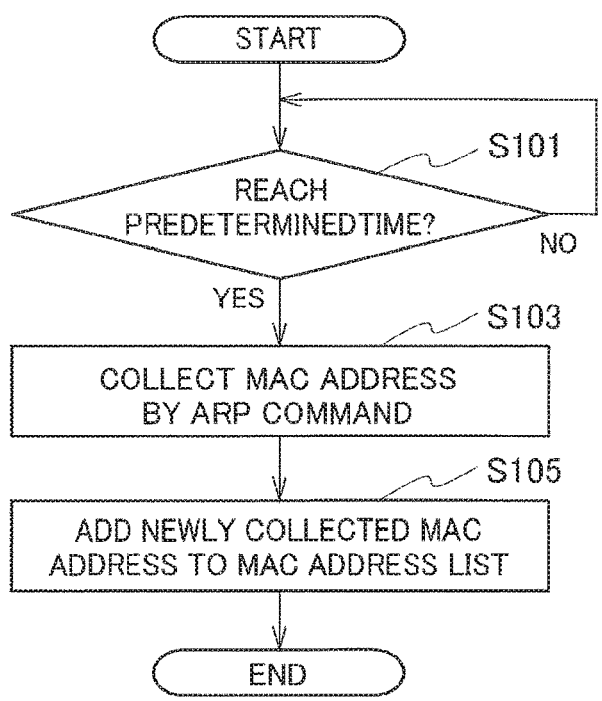
FIG. 2 is a flowchart of a MAC address update process performed by the printing machine according to the exemplary embodiment of the present invention.

FIG. 2 is a flowchart of a MAC address update process performed by the printing machine 1.

As shown in FIG. 2, the printing machine 1 communicates with each of the information processing machine 2 connected to the network 3 by an ARP command at predetermined intervals (step S101), and collects each MAC address (step S103).

The printing machine 1 adds a newly collected MAC address to the ARP table (MAC address list) stored in the storing unit 12 (step S105).

This enables the ARP table (MAC address list) to be updated at predetermined intervals while the power is on.

(Power-Off Process)

When the printing machine 1 is relocated, or users who use the installed printing machine greatly change due to an entity conversion, operations are usually performed with the printing machine 1 turned off. Upon this, to compare the ARP table (MAC address list) immediately before the power is turned off with the ARP table (MAC address list) immediately after the power is turned on, it is necessary, on reception of a power-off request, to bring the ARP table (MAC address list) up-to-date firstly before executing a process to turn off the power.

Figure 3:
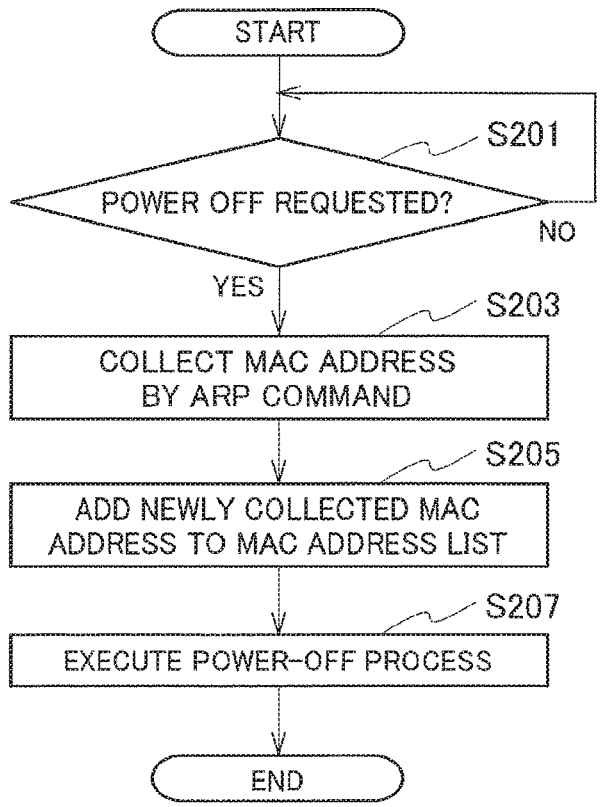
FIG. 3 is a flowchart of a process performed by the printing machine according to the exemplary embodiment of the present invention when the power of the printing machine is turned off.

FIG. 3 is a flowchart of a process performed by the printing machine 1 when the power is turned off.

As shown in FIG. 3, when the power-off is requested through a user operation (step S201), the printing machine 1 communicates with each of the information processing machines 2 connected to the network 3 by an ARP command, and collects each MAC address (step S203).

The printing machine 1 adds a newly collected MAC address to the ARP table (MAC address list) to update the ARP table (MAC address list) stored in the storing unit 12 (step S205).

The printing machine 1 then executes a process of turning off own machine (step S207).

In this way, the ARP table (MAC address list) immediately before the power-off is brought up-to-date. When the printing machine 1 is turned on next time, the printing machine 1 compares the ARP table (MAC address list) immediately before the power-off with the ARP table (MAC address list) immediately after the power-on. This makes it possible to suppose that the printing machine 1 is relocated, or users who use the installed printing machine greatly change due to an entity conversion.

(Power-on Process)

Figure 4:
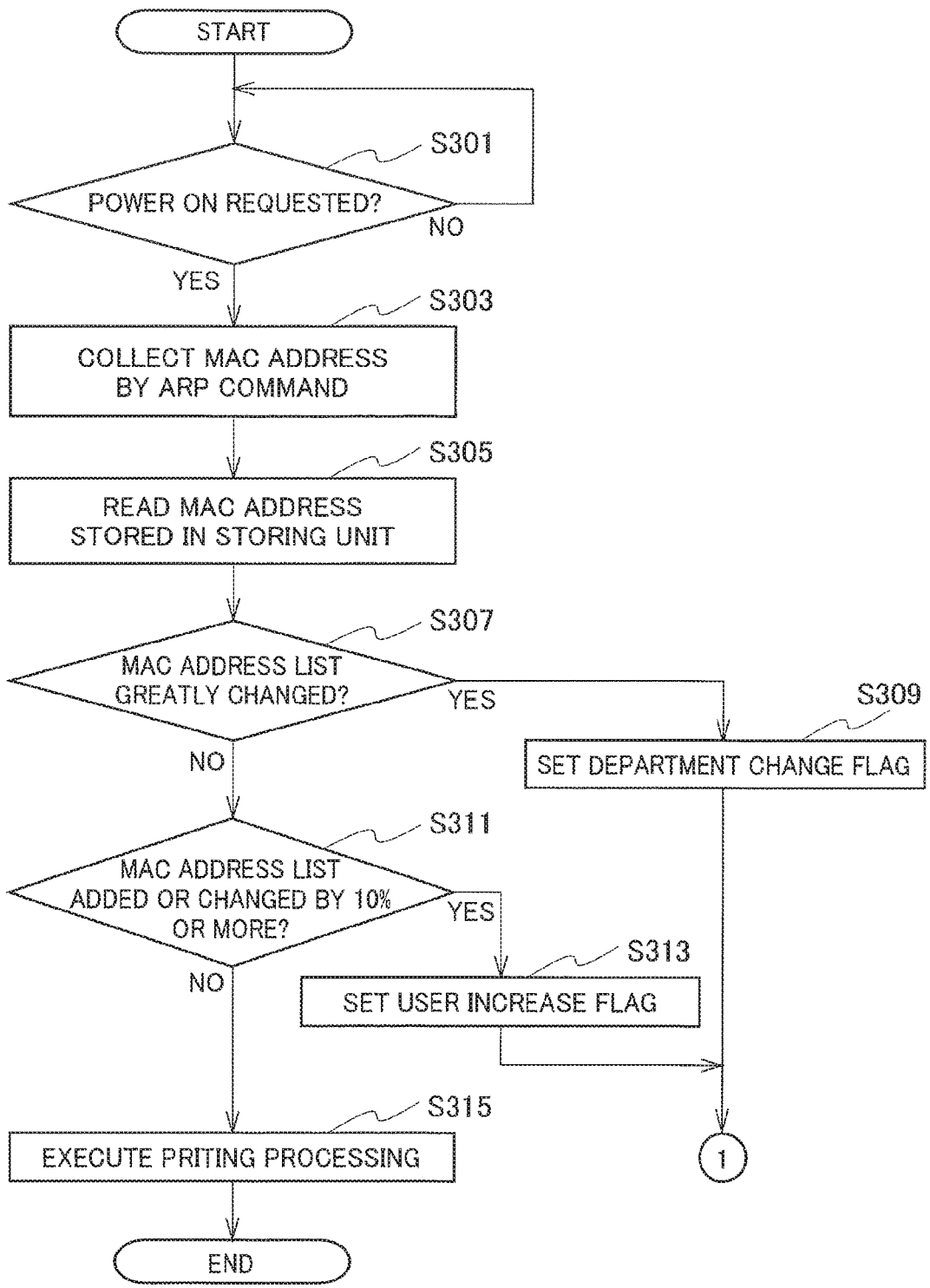
Figure 5:
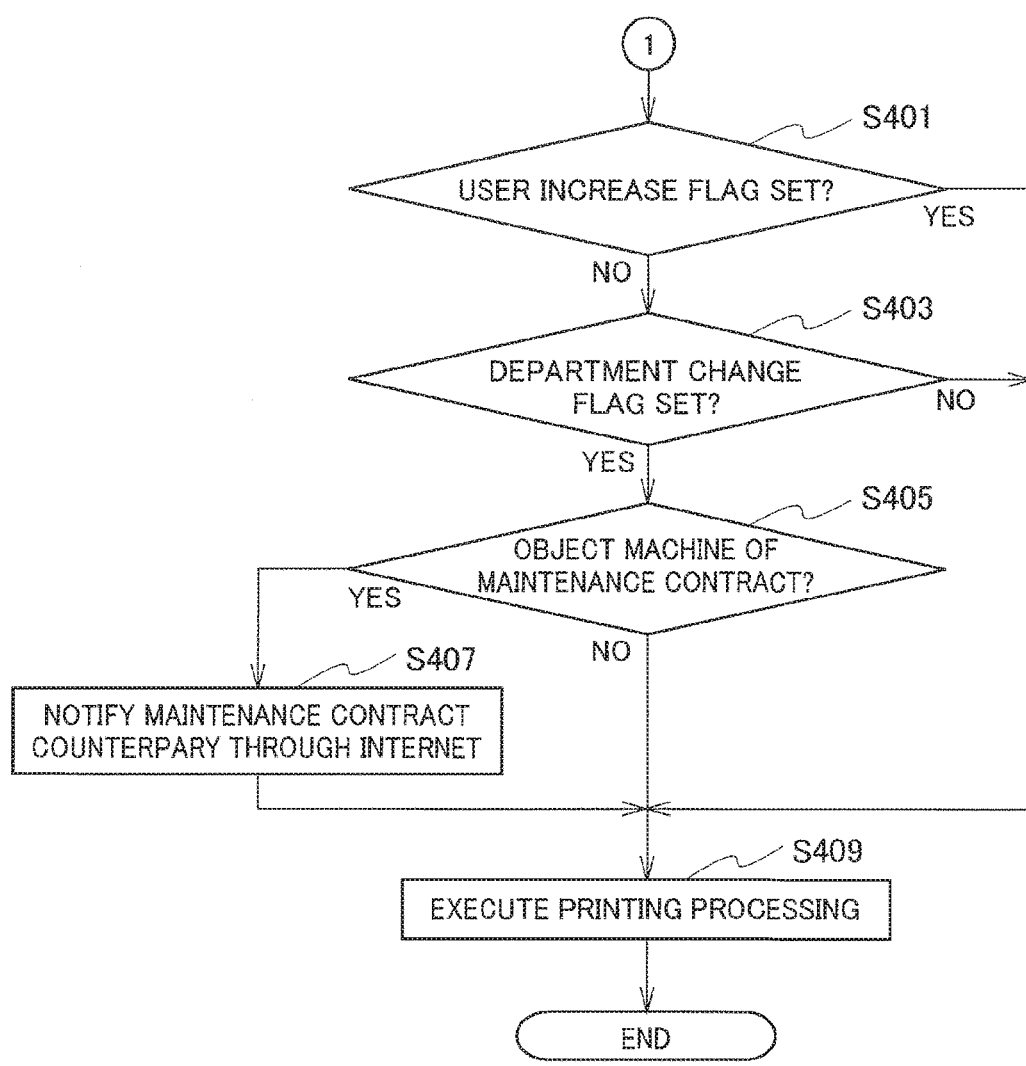
Figure 6:
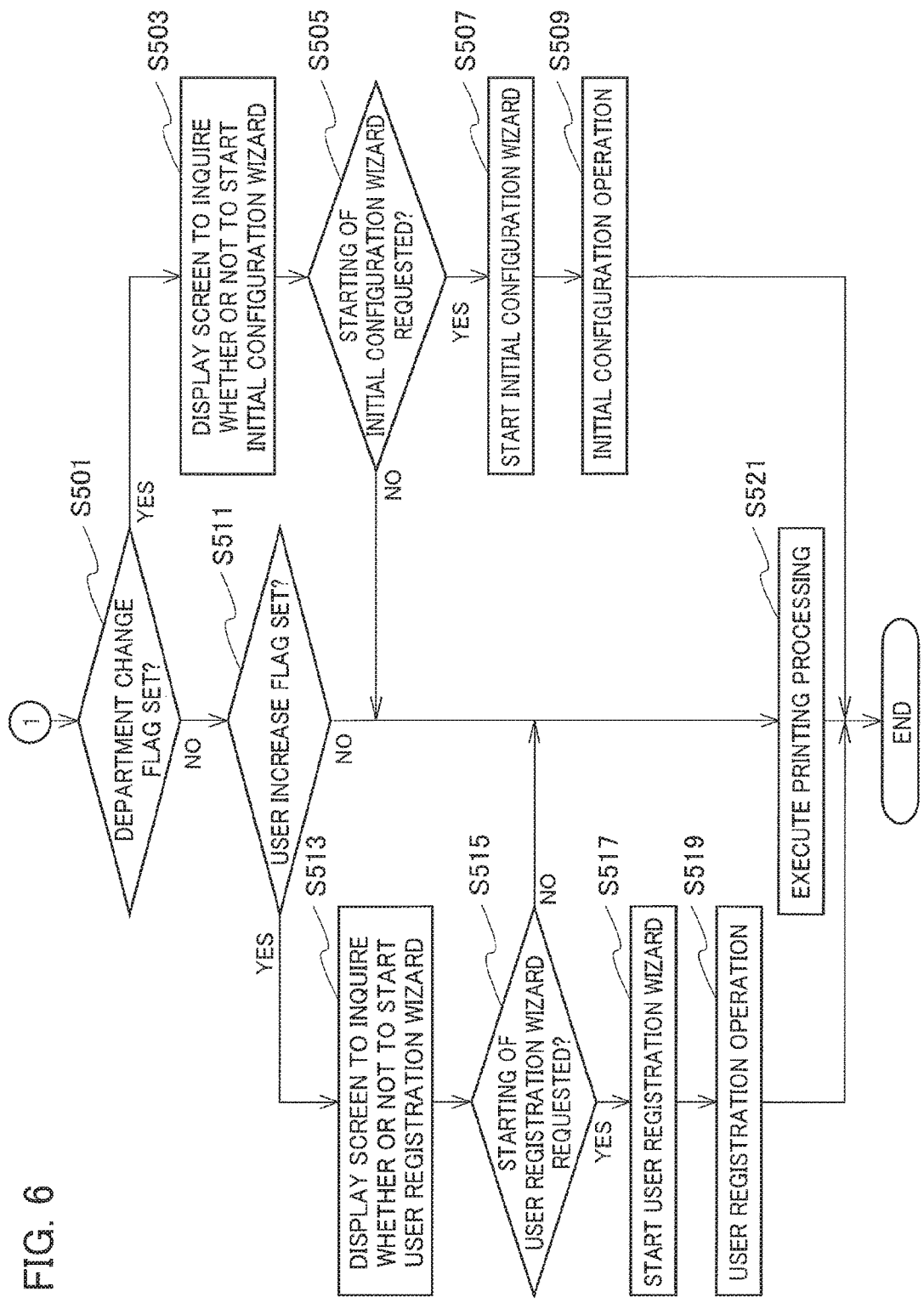

FIGS. 4 to 6 are flowcharts of processes performed by the printing machine 1 when the power is turned on. In particular, FIG. 5 is a flowchart of a process related to maintenance. FIG. 6 is a flowchart of an initial configuration support process and a registration support process.

As show in FIG. 4, when the power-on is requested through a user operation (step S301), the determination section 11*a* of the CPU 11 of the printing machine 1 communicates with each of the information processing machines 2 connected to the network 3 by an ARP command and collects each MAC address (step S303).

Next, the determination section 11*a* reads the ARP table (MAC address list) stored in the storing unit 12 (step S305).

The determination section 11*a* then compares the MAC addresses collected at step S303 with the MAC addresses in the ARP table read at step S305. The determination section 11*a* subsequently determines whether or not the MAC addresses in the ARP table read at step S305 are greatly changed (step S307). For example, as a result of the comparison, if 50% or more of the MAC addresses in the ARP table read at step S305 is not shown and 50% or more of MAC addresses is added, the determination section 11*a* determines that the MAC addresses are greatly changed.

When the determination section 11*a* determines that the MAC addresses are greatly changed (step S307; YES), it is supposed that the printing machine is relocated, or users who use the installed printing machine greatly change due to an entity conversion while the power is off.

The determination section 11*a* then sets a department change flag (step S309), and the process moves to step S401 in FIG. 5 and step S501 in FIG. 6.

When the determination section 11*a* determines that the MAC addresses are not greatly changed (step S307; NO), for example, when the MAC addresses collected at step S303 and the MAC addresses in the ARP table read at step S305 are the same by 50% or more, it is supposed that the printing machine is not relocated, or users who use the installed printing machine do not greatly change due to an entity conversion while the power is off.

The determination section 11*a* next determines whether or not 10% or more of the MAC addresses in the ARP table read at step S305 is added or changed (step S311).

When the determination section 11*a* determines that 10% or more of the MAC addresses in the ARP table read at step S305 is added or changed (step S311; YES), it is supposed that the printing machine is not relocated, or users who use the installed printing machine do not greatly change due to an entity conversion while the power is off. It is however supposed that several users who use the printing machine 1 are added at once, for example, several new employees are assigned. In such a case, it is necessary to perform a user registration for added users.

The determination section 11*a* thus sets a user increase flag (step S313), and the process moves to step S401 in FIG. 5 and step S501 in FIG. 6.

On the other hand, when the determination section 11*a* determines that 10% or more of the MAC addresses in the ARP table read at step S305 is not added or changed (step S311; NO), usual printing processing is executed (step S315). Specifically, on reception of a printing job, the printing machine 1 performs printing processing on the basis of the received printing job. In this case, without a user registration at this timing, it is possible to register a new user through a user operation on the operation panel unit 14 later on.

When the department change flag is set at step S309, or the user increase flag is set at step S313, as shown in FIG. 5, the determination section 11*a* determines whether or not the user increase flag is set (step S401).

When the user increase flag is not set (step S401; NO), and the department change flag is set (step S403), it is supposed that the printing machine 1 is relocated, or users who use the installed printing machine greatly change due to an entity conversion while the power is off. When the printing machine 1 is the object machine of the maintenance contract, it is necessary to notify the maintenance contract counterparty terminal 4 of the need for maintenance.

The notification section 11*c* first determines whether or not the printing machine 1 is the object machine of the maintenance contract (step S405). Specifically, the notification section 11*c* determines that the printing machine 1 is the object machine of the maintenance contract when the maintenance object flag stored in the storing unit 12 is set.

When the notification section 11*c* determines that the printing machine 1 is the object machine of the maintenance contract (step S405; YES), the notification section 11*c* reads the contact address of the maintenance contract counterparty from the storing unit 12, and notifies the maintenance contract counterparty terminal 4 of the need for maintenance using the read contact address (step S407).

On the other hand, when the notification section 11*c* determines that the printing machine 1 is not the object machine of the maintenance contract (step S405; NO), the execution section 11*b* executes the usual printing processing (step S409).

In this way, when the number of changes in the MAC addresses at the time when the printing machine 1 is turned on is a predetermined ratio or more, and the maintenance object flag stored in the storing unit 12 indicates that the printing machine 1 is the object machine of the maintenance contract, the notification section 11*c* notifies the contact address of the need for maintenance through the network 3. As a result, the maintenance contract counterparty decides that there is the need for maintenance. This enables the printing machine 1 to receive enough maintenance by the maintenance contract counterparty without the user especially notifying the maintenance contract counterparty of relocation of the printing machine 1 or an entity conversion.

When the department change flag is set at step S309 shown in FIG. 4, or the user increase flag is set at step S313 shown in FIG. 4, the determination section 11*a* determines whether or not the department change flag is set (step S501), as shown in FIG. 6.

When the department change flag is set (step S501; YES), it is supposed that the printing machine 1 is relocated, or users who use the installed printing machine greatly change due to an entity conversion while the power is off. In such a case, performing the initial configuration for the printing machine again configures an appropriate usage environment for the printing machine.

The determination section 11*a* displays a screen to inquire of the user whether or not to start an initial configuration wizard (step S503).

When starting of the initial configuration wizard is requested through a user operation on the operation panel unit (step S505; YES), the execution section 11*b* starts the initial configuration wizard (step S507), and executes an initial configuration operation (step S509). Specifically, the execution section 11*b* makes the operation panel unit 14 display the initial configuration wizard. In accordance with screen transitions the user performs input operations, and initial configuration items are set, which include a user registration, a network setting, a language setting, a time setting, and the like.

In this way, when the department change flag is set, the screen to inquire of the user whether or not to start the initial configuration wizard is automatically displayed. When the starting of the initial configuration wizard is requested through a user operation on the operation panel unit 14, the execution section 11*b* executes the initial configuration operation. Inputs by the user in accordance with the initial configuration wizard thus completes the initial configuration without the user starting the initial configuration screen to perform the initial configuration. This calls user's attention, and prevents the user from forgetting the initial configuration, thereby enabling the user to perform an appropriate initial configuration, when the printing machine 1 is relocated, or users who use the installed printing machine greatly change due to an entity conversion while the power is off.

On the other hand, when the department change flag is not set (step S501; NO), the determination section 11*a* determines whether or not the user increase flag is set (step S511).

When the user increase flag is set (step S511; YES), it is supposed that several users who use the printing machine 1 are added at once, for example, several new employees are assigned. In such a case, it is necessary to remember to perform the user registration for those added plural users.

The determination section 11*a* thus displays the screen to inquire of the user whether or not to start a user registration wizard (step S513).

When starting of the user registration wizard is requested through the user operation on the operation panel unit 14 (step S515; YES), the execution section 11*b* executes a user registration operation (step S517). Specifically, the execution section 11*b* makes the operation panel unit 14 display the user registration wizard. In accordance with screen transitions, the user performs input operations only to register the users who use the printing machine 1.

In this way, when the user increase flag is set, the screen to inquire of the user whether or not to start the user registration wizard is automatically displayed. When the starting of the user registration wizard is requested through the user operation on the operation panel unit 14, the execution section 11*b* executes the user registration operation. Inputs by the user in accordance with the user registration wizard thus completes the user registration without the user starting the user registration screen to perform the user registration. This calls user's attention, and prevents the user from forgetting the user registration, thereby enabling the user to perform an appropriate user registration, when several users who use the printing machine 1 are added at once, for example, several new employees are assigned, while the power is off.

When the starting of the initial configuration wizard is not requested through the user operation on the operation panel unit 14 (step S505; NO), when the user increase flag is not set (step S511; NO), or when the starting of the user registration wizard is not requested through the user operation on the operation panel unit 14 (step S515; NO), it is determined that neither the initial configuration support process to support the execution of the initial configuration nor the user registration support process to support the execution of the user registration process is needed. The execution section 11*b* thus executes the usual printing processing (step S521).

As described above, according to the printing machine 1, the determination section 11*a* collects MAC addresses of the information processing machines 2 through the network when the printing machine 1 is turned on, and compares the collected MAC addresses with the MAC addresses stored in the storing unit 12. On the basis of the number of changes in the comparison, the determination section 11*a* determines which of an initial configuration support process and a registration support process is to be executed. The initial configuration support process supports an execution of an initial configuration of the printing machine 1, and the registration support process supports an execution of a registration process of the terminal.

For that reason, for example, when the printing machine 1 is relocated, or users who use the installed printing machine greatly change due to an entity conversion, it is possible to execute the initial configuration support process. Moreover, when several users who use the printing machine 1 are added at once, for example, several new employees are assigned, it is possible to execute the registration support process.

This enables the user not to forget the initial configuration and the registration process, and to appropriately perform the initial configuration or the user registration.

What is claimed is:

1. A printing machine to be connected with a plurality of terminals through a network to execute printing processing based on a printing job sent from each terminal, the printing machine comprising:
   a storage device that stores MAC addresses of all terminals connected to the printing machine when the printing machine is turned off; and
   a processor that
      collects MAC addresses of all terminals connected to the printing machine through the network when the printing machine is turned on,
      determines which of an initial configuration support process and a registration support process is to be executed based on the number of changes in a comparison of the MAC addresses collected with the MAC addresses stored in the storage device, the initial configuration support process supporting an execution of an initial configuration of the printing machine, and the registration support process supporting an execution of a registration process of the terminal, and
      executes the determined process.

2. The printing machine according to claim 1, wherein the storage device further stores a maintenance object flag to indicate whether or not the printing machine is an object machine of a maintenance contract, and a contact address of a maintenance contract counterparty, and
   wherein when the number of changes in the MAC addresses at a time when the printing machine is turned on is a predetermined ratio or more, and when the maintenance object flag stored in the storage device indicates that the printing machine is the object machine of the maintenance contract, the processor notifies the contact address of the need for maintenance through the network.

\* \* \* \* \*